United States Patent
Nieminen et al.

(10) Patent No.: US 6,453,808 B1
(45) Date of Patent: Sep. 24, 2002

(54) METHOD AND APPARATUS FOR MARKING PAPER, BOARD AND CELLULOSE WEB ROLLS

(75) Inventors: Esko Nieminen, Hyvinkää ; Pertti Aimonen, Lahti, both of (FI)

(73) Assignee: Valmet Corporation, Helsinki (FI)

( * ) Notice: Subject to any disclaimer, the term of this patent is extended or adjusted under 35 U.S.C. 154(b) by 0 days.

(21) Appl. No.: 09/622,303

(22) PCT Filed: Mar. 2, 1999

(86) PCT No.: PCT/FI99/00161
§ 371 (c)(1),
(2), (4) Date: Aug. 15, 2000

(87) PCT Pub. No.: WO99/44935
PCT Pub. Date: Sep. 10, 1999

(30) Foreign Application Priority Data

Mar. 2, 1998 (FI) .................................................. 980474

(51) Int. Cl.[7] .............................................. B41F 17/16
(52) U.S. Cl. ............................. 101/43; 101/44; 414/911
(58) Field of Search ................................ 242/534, 912; 414/911; 101/35, 41, 42, 43, 44

(56) References Cited

U.S. PATENT DOCUMENTS

| | | | |
|---|---|---|---|
| 4,463,251 A | * 7/1984 | Koutonen et al. | ........... 235/470 |
| 4,593,643 A | 6/1986 | Saviolo | ................ 168/72 |
| 5,085,377 A | * 2/1992 | Rohrer et al. | ................ 242/58.6 |
| 5,262,804 A | 11/1993 | Petigrew et al. | ........ 346/140 R |
| 5,354,976 A | * 10/1994 | Mäkinen et al. | ............ 235/462 |
| 6,095,414 A | * 8/2000 | Long et al. | ................. 235/385 |

FOREIGN PATENT DOCUMENTS

| | | | |
|---|---|---|---|
| DE | 32 04 243 A1 | 8/1982 | ............ G06K/1/12 |
| GB | 2 286 822 A | 8/1995 | ........... B65H/23/04 |

OTHER PUBLICATIONS

DE–32042432–A1, Aug. 1982, Timonen, English Abstract.*
DE–32042432–A1, Aug. 1992, Timonen, Derwent English Abstract.*

* cited by examiner

*Primary Examiner*—Daniel J. Colilla
(74) *Attorney, Agent, or Firm*—Cohen, Pontani, Lieberman & Pavane

(57) ABSTRACT

A method and apparatus for automatically marking paper, board or cellulose web rolls at a slitter for the purpose of identifying the rolls during later finishing steps. Such finishing operations include, e.g., roll transport, rewinding, sheeting or other finishing steps and roll packaging. The roll identification code is also used for material management related to customer rolls. The roll identification information of a roll set leaving the slitter, that is, the sequence of rolls exiting from the slitter as a group is transmitted for the use of the roll marking equipment and the customer rolls are moved away from the slitter area only via the roll marking equipment and new rolls are prevented from entering the slitter area in any other form except as a new roll set. As a result, the correct identification data for each roll set is continuously available to the marking equipment.

14 Claims, 3 Drawing Sheets

METHOD AND APPARATUS FOR MARKING PAPER, BOARD AND CELLULOSE WEB ROLLS

PRIORITY CLAIM

This is a U.S. national stage of PCT application No. PCT/FI99/00161, filed on Mar. 2, 1999. Priority is claimed on that application and on Application No. 980474, filed in Finland on Mar. 2, 1998.

FIELD OF THE INVENTION

The present invention relates to a method and apparatus for marking paper, board and cellulose web rolls at a slitter for the purpose of identifying the rolls during later finishing steps. Such finishing operations include, e.g., roll transport, rewinding, sheeting or other finishing steps and roll packaging.

BACKGROUND OF THE INVENTION

In the roll handling systems of paper, board and pulp mills, the rolls must be identified during each processing step in order to assure correct deliveries to correct addresses, properly packaged and combined into shipments to correct customers. Rolls ordered from different customers, referred to herein as customer rolls, are processed to customer specifications by slitting from machine rolls at a slitter to specified width and roll diameter, thus fulfilling the customer order of a specified amount of paper or board having a desired width. Generally, a barcode sticker is used for marking rolls made at a slitter. The later process stages are equipped with barcode readers capable of identifying rolls from the information read from the barcode sticker. Currently, the barcode sticker is attached manually on each roll at the slitter. The slitter operator reads the roll set data from the control system display of the slitter in order to identify the rolls discharged from the slitter and next prepares roll identification barcode stickers that are then attached to the rolls by the operator. Typically, a self-adhesive barcode sticker is used that is adhered to the roll end or in some board mills, to the roll wrapper. Alternatively, the identification label can be inserted into the center bore of the roll core or attached by a stapler to the core end. The cost of a single barcode sticker is about US. $ 0.02–0.03 per sticker. In manual placement of barcode stickers, the reliability of the product identification method is chiefly dictated by the discipline conducted by the slitter operators. If good care is not exercised in the attachment of the barcode sticker, it may disappear during shipment, it may become attached to the wrong roll or in an incorrect position or otherwise misplaced . Any of these defects can cause problems in the identification of the roll or a misidentification of the roll, thus resulting in a delay during later handling of the roll. Furthermore, such a conduct is contrary to the principles of quality assurance systems, because the error thus invoked can be detected only in the next processing step and defective products have thus already been able to slip further in the process than is possible in a system based on realtime detection of possible errors. Moreover, the manual method of attaching barcode stickers to the roll ends requires more personnel and may compromise occupational safety at the slitter if the operator fails to follow the discipline of working instructions. For instance, in the handling of rolls it is imperative that the operator not approach the rolls until their movement on the rolling ramp of the slitter is entirely brought to a halt. As even the smallest rolls currently used have a mass of about 200–300 kg and the largest may be from 6 to 8 tons, they cannot be managed manually. Hence, it can be seen that all the work performed at a slitter should be preferably made using automatic roll handling equipment.

The slitter also outputs rolls not necessarily requiring an identification code. Typically, this type of roll is a so-called edge trim roll which is an unwanted roll resulting from, e.g, paucity of customer roll orders or the width mismatch of ordered rolls with the stock web width from which the machine roll is wound. In some mills, these edge trim rolls, which represent a production loss are an everyday problem. The processing of edge trim rolls varies mill by mill. One approach is to identify the edge trim rolls in the same fashion as customer rolls, after which they are launched on the conveyors along with the customer rolls or alternatively, they are rolled forward without an identification sticker or even taken directly to the shredder area for repulping. The same routine is also applied to so-called reject rolls. A reject roll is a rewound roll, initially produced as a customer roll at the slitter, but then found defective due to such a production flaw that prevents its shipment to the original or any other customer.

Slitter roll run data also include information on paired and multiple slit rolls complemented with their identification codes. Typically, paired and multiple rolls are narrow rolls discharged from the slitter and later grouped into a shipment. Roll bundling takes place so that the first roll of the bundle is pushed aside awaiting for the next roll to be included in the bundle. When the next roll arrives, the operator moves the rolls side by side and combines them into a shipping bundle whose structure can be additionally secured by different strapping techniques. Bundling can be carried out either on the mill floor or on conveyors. Paired or multiple rolls to be bundled together may be assembled from a single roll set, two successive sets or a multiplicity of successive sets.

When the customer rolls are marked with identification bar codes in the above-described manner, the mill has to use two parallel coding systems. The roll identification bar code is utilized only during roll handling inside the mill. Additionally, the roll ends are provided with a numeric or alphabetic code serving the paper or board product buyer with information on the roll type and paperi/board grade. The customer-specific roll identification code is entirely ignored in the internal roll handling system of the mill. Obviously, such dual marking of a roll causes extra costs.

SUMMARY OF THE INVENTION

It is an object of the present invention to provide a method suited for automatic marking of paper, board and cellulose web rolls at the slitter using the same roll identification system that is used for labelling the rolls with information serving the customer.

The goal of the invention is achieved by providing the roll marking equipment with the identification data related to a roll set, that is, a set of slit rolls leaving the slitter and subsequently transferring the customer rolls away from the slitter area only via the roll marking equipment and simultaneously preventing new rolls from entering the slitter area in any other form except as a new roll set. Thus, the correct identification data for each roll set is available to the marking equipment at all times.

The marking equipment marks a roll automatically with the correct identification data advantageously using the same format as is used in marking the roll with the customer data.

According to one embodiment of the invention, the roll marking equipment is provided with the identification data related to a roll set, that is, a set of slit rolls leaving the slitter and the roll entering the marking station is measured for at least one verification parameter such as roll width, for instance, and if so required, also for such parameters as roll diameter and weight, for instance, whereby also the end inward bulging and roll core stick-out can be detected. The measured verification data is compared with the data of the roll set, wherein it is possible to identify each roll from each set and to check whether the correct roll has entered the marking station. Next, the roll is automatically marked with the roll identification data advantageously using the same format as is used in marking the roll with the customer information. The use of the verification data is not mandatory, but the verification data can be utilized, e.g., for backing the quality assurance system and gathering product parameter data.

The invention offers significant benefits.

By virtue of the invention, it is possible to utilize the same marking as is made on rolls produced for direct shipment to customers also in the internal roll identification system of the mill. Hence, the barcode identification system based on stickers or labels can be omitted, whereby equipment for printing barcode stickers or labels can be disposed with. The identification data to be marked on the rolls can be made simply by printing directly on the roll surface with the help of an ink-jet printer, for instance. Accordingly, the operator need not enter the hazard zone of roll movement for adhering barcode stickers/labels on the roll ends that may sometimes be located very close to each other. On the contrary, the slitter operator can stay in his isolated control room without being compelled to move at all about in the roll transfer area, whereby the occupational safety level is substantially elevated. When the identification data is printed directly on the roll surface, the risk of lost or misplaced identification stickers/labels is eliminated. Also the operation of the roll packaging machine is speeded, because the packaging machine need not print the roll with a separate customer identification data.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
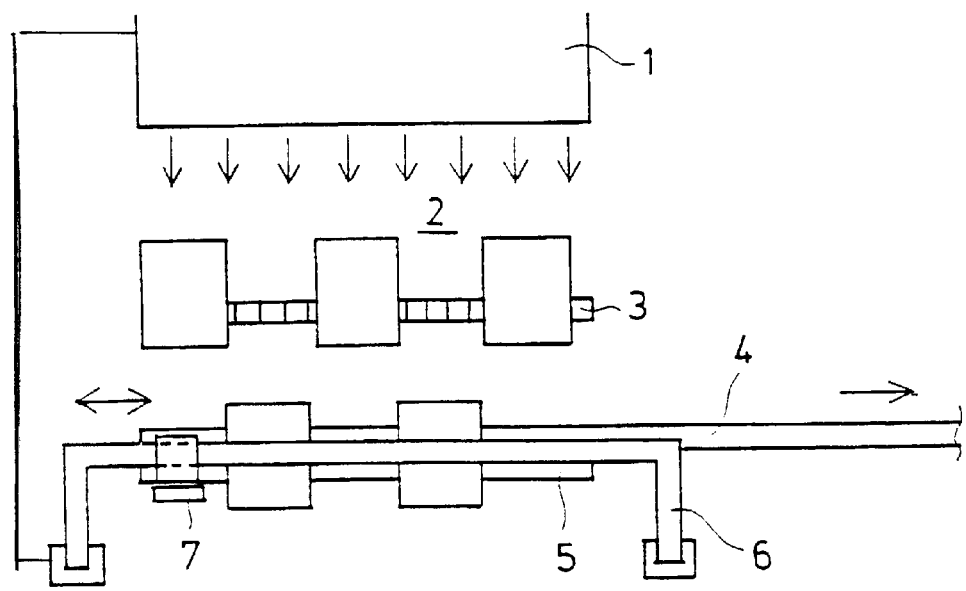
FIG. 1 shows a top view of an embodiment of the invention according to the invention.

Referring to FIG. 1, the apparatus layout shown therein is suited for use on a support roll type slitter in which the set of slit rolls is discharged on one side of the slitter. In FIG. 1, the slitter is simply represented by its tilting cradle 1 that discharges the slit rolls as a single set of rolls onto a downward ramp 2. In the handling of paper rolls, the system handles the roll set leaving the slitter as an entity. The ramp 2 is provided with a roll-separating stop 3 for the handling of the rolls. Obviously, the system may include a greater number of roll stops, and the buffering of the rolls sets may be accomplished by means of floor-level retractable back-gauges if so desired. The backgauge helps arrest a set of multiple rolls discharged from the slitter as a complete roll set waiting for the next step on the downward ramp. On the contrary, the function of the roll-separating stop is to separate the rolls of a set discharged from the slitter amply apart from each other so that sufficient space is provided between the roll ends, e.g., for making markings on the roll ends. At the lower end of the downward ramp there is disposed a conveyor 4 serving to transfer the rolls after marking forward in the travel direction of the conveyor. Cooperating with the conveyor 4 there is disposed a fixed backgauge 5 serving to halt the rolling of the spaced-apart roll set and to prevent the further rolling of the rolls down onto the mill floor. The fixed backgauge can be replaced by an actuator-driven device such as a roll set stop. Above the conveyor 4 is placed an automatic roll marking equipment 6 which is provided with the identification data related to a roll set from which the rolls are separately marked. Marking printers 7 and/or 8 are used to print the roll identification data and/or customer roll marking on the roll ends.

In the later process steps, the marking made on the roll surface is used for roll identification. The marking is read in the subsequent stages with the help of a text recognition, matrix code or barcode reader. If the roll identification is unsuccessful due to missing roll data or any other reason preventing roll identification, the operator can still perform the conventional routines comprising the steps of reading the roll number from the control system display, scrolling the roll information on the screen and entering the roll number manually into the control system of the product finishing line. If the roll must be taken to the rewinder, the rewound roll will be marked with new roll identification data and/or the customer code.

Figure 3:
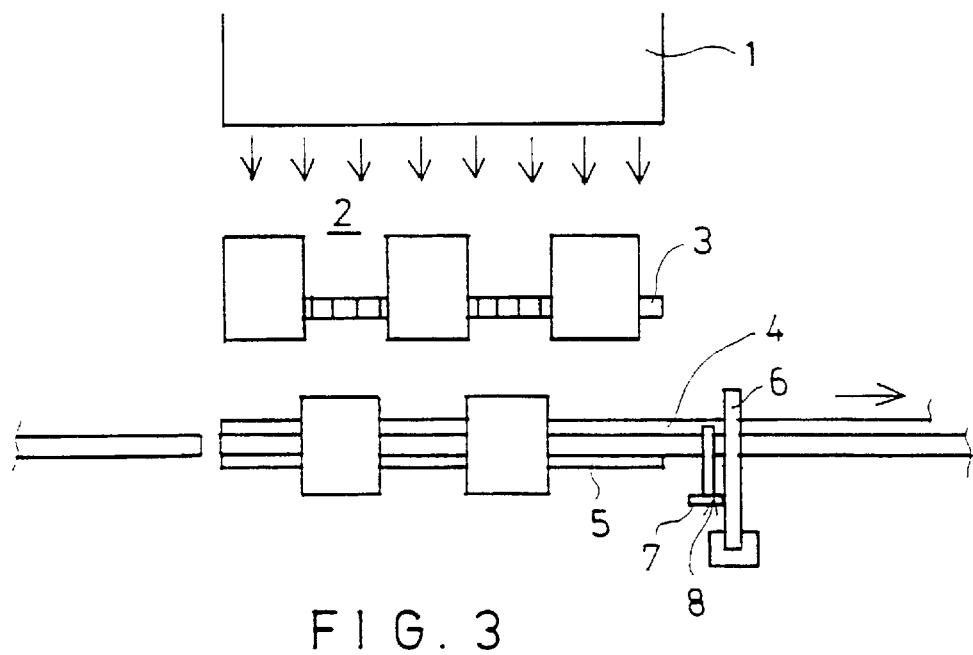
FIG. 3 shows another alternative embodiment of the invention.
Figure 4:
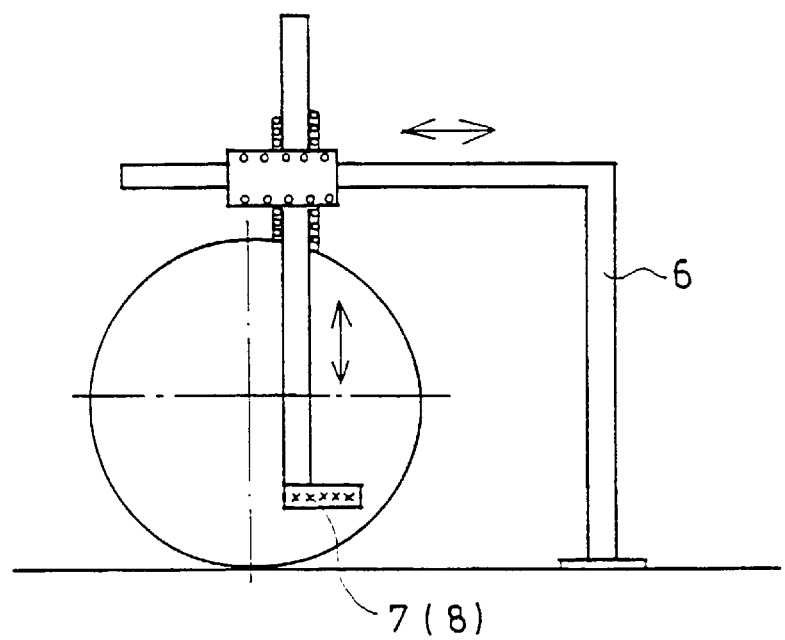
FIG. 4 shows a side view of the embodiment illustrated in FIG. 3.

Also the ramp 2 shown in FIG. 3 is provided with roll-separating stops 3. At these stops, the rolls of the set can be separated from each other by driving some of the roll stops up and leaving the others flush with the floor level. Then, the rolls meeting the elevated stops will remain at the roll-separating stops 3, while the other rolls continue rolling down to the conveyor 4 at the lower end of the ramp, where they are stopped by a stop 5. This roll separating technique provides sufficient room between the rolls. The marking of the rolls takes place at the marking equipment 6 when the rolls are transferred away from the area of the ramp 2 by means of the conveyor 4. The marking equipment comprises a marking device 7, 8 capable of marking either only one end of the roll, both ends thereof or its wrapper circumference. The marking with this device takes place in the same fashion as with the marking device of the equipment shown in FIG. 1, which means that the marking device must be provided with the required information concerning the roll set and the marking printer marks the roll with roll identification data and/or the customer code.

Figure 2:
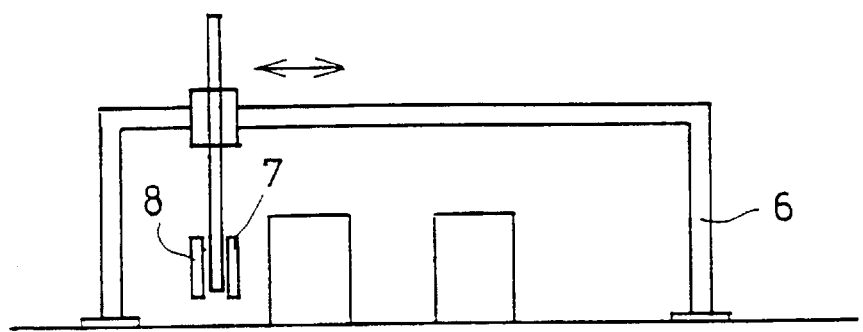
FIG. 2 shows a side view of the embodiment illustrated in FIG. 1.
Figure 7:
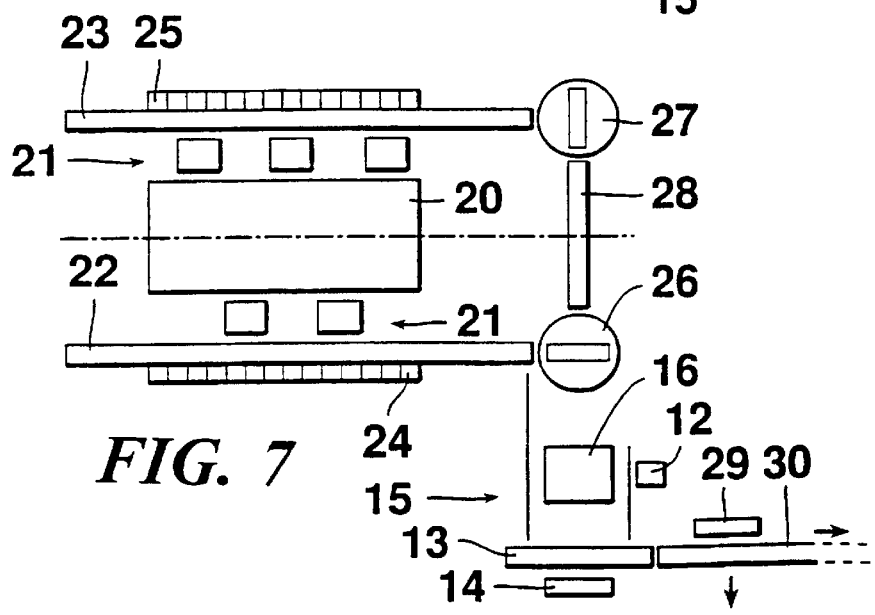
FIG. 7 shows a fifth alternative embodiment of the invention.

FIG. 7 shows a typical layout of a center shaft-supported winder-slitter. In a shaft-supported winder-slitter, rolls 21 are discharged into two separate sets to both sides of the slitter 20. Hence, the separation of the rolls 21 takes places already at the slitter 20. To both sides of the slitter 20 there is disposed a conveyor 22, 23 combined with roll backgauges 24, 25 serving to prevent the further rolling of the rolls from the sides of the slitter down onto the mill floor. Above the conveyors 22, 23 are placed the marking devices of automatic roll marking equipment 15 which is provided with the identification data related to a discharged roll set. Marking of rolls with the help of the marking devices takes place in the same fashion as with the equipment shown in FIG. 1. Obviously, the marking equipment can be placed in the same fashion as shown in FIG. 2, whereby the marking operation is carried out similarly as with the equipment of FIG. 2 when the rolls 21 are removed from the ramp area. Rolls leaving the conveyor 22 can be moved directly onto a turntable conveyor 26, wherefrom they can be transferred downstream along the conveyor system. Rolls leaving the conveyor 23 are first moved to a turntable conveyor 27, which is next rotated crosswise to the conveyor 23. Subsequently, the roll can be passed from the turntable conveyor 27 to a conveyor 28 located at the end of the slitter. At the end of the conveyor 28 located at the end of the slitter 20, there is disposed another turntable conveyor 26. First, this turntable conveyor 26 must next be rotated parallel to the conveyor 28, before the roll can be passed onto the turntable conveyor 26, after which the turntable conveyor is rotated parallel to the conveyor 22. When the turntable conveyor 26 is parallel to the conveyor 22, the roll resting on the former can be transferred further in the conveyor system.

The layout alternatives shown in FIGS. 1–4 have in common that rolls cannot be moved away from the slitter area by any means prior to the marking equipment and that the rolls cannot enter the slitter area from any other route prior to the marking device. As a Result, the actual row of physical rolls and the information associated with the rolls in the row cannot be confused. Herein, the terms roll removal and addition are used in reference to such removal and addition of rolls than can be performed by normal production process operations such as manual rolling, for instance. The control system of the slitter is arranged to monitor the roll dimensions and secure that the produced rolls have a correct width and diameter.

Figure 5:
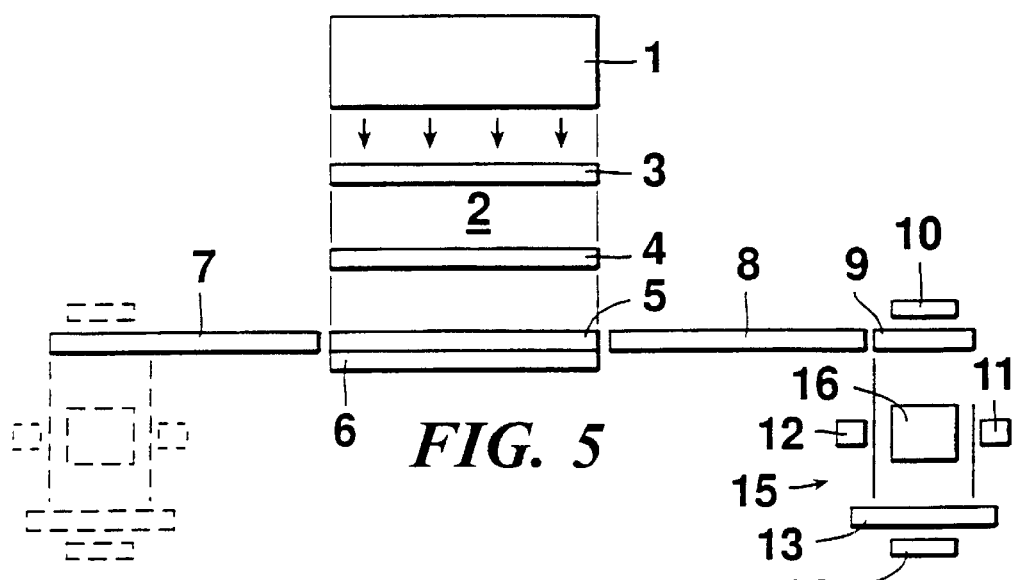
FIG. 5 shows a third alternative embodiment of the invention.
Figure 6:
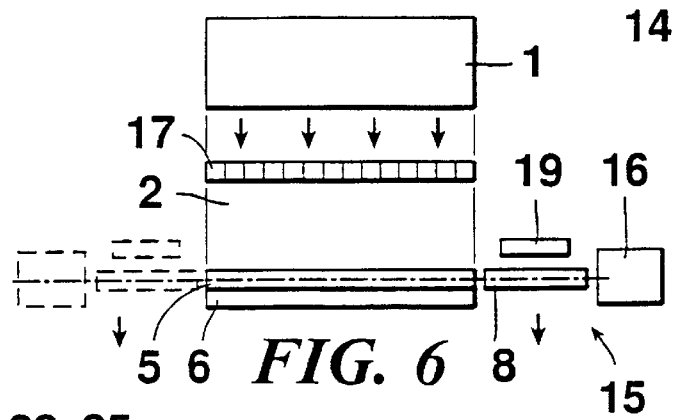
FIG. 6 shows a fourth alternative embodiment of the invention.

FIGS. 5 and 6 show the layout of a support-shaft-type slitter, wherein rolls can be removed or added between the slitter and the marking equipment under the control of the material flow system. In the diagram, the slitter is simply represented by its tilting cradle 1 that discharges the slit rolls as a single set of rolls onto a downward ramp 2. In FIG. 5, for roll handling, the ramp 2 is provided with two floor-level retractable backgauges 3, 4 or roll-separating stops 3, 4. Obviously, the system may include a greater number of roll-separating backgauges and stops, or alternatively, a combination of one roll-separating stop and one retractable backgauge is possible. FIG. 6 shows one roll-separating stop 3. When desired, the backgauge can be operated to stop a set of multiple rolls discharged from the slitter as a complete roll set to wait on the ramp until the conveyor 35 at the lower end of the ramp is free to receive the set. At the roll-separating stop, some rolls of the roll set can be halted on the ramp 2, whereby the rest of the rolls continue rolling down the ramp thus making it possible to select desired rolls from a set to be transferred forward as sequenced subsets. If the stops of the ramp are replaced by retractable backgauges, the separation of the rolls of the set from each other must be performed on the conveyors. Roll separation at the conveyors is carried out so that a roll is first passed from one conveyor to the next, and prior to the transfer of the roll to the second conveyor, the first conveyor is stopped and the second conveyor is moved forward by a predetermined distance before the entry of the next roll. This technique provides a sufficient room between the rolls. In the layout illustrated in FIGS. 5 and 6, the roll separation on the conveyors can be made at either the cross-over point between conveyors 35 and 18, or alternatively, between conveyors 18 and 9. For rolls of some paper, board and cellulosic pulp grades, roll separation at the conveyors may also be implemented by providing a suitable speed difference between the first and the second conveyor 50 that the second conveyor pulls a required gap between the successive rolls at the cross-over point between the conveyors. At the lower end of the downward ramp there is disposed a conveyor 35 serving to deliver the rolls either to a second conveyor 17 which is disposed at its exit end and from which the rolls are taken to further internal process steps of the mill, or alternatively, the rolls can be passed from the conveyor 35 disposed at the lower end of the ramp 2 to a conveyor 18 which takes the rolls to automatic roll marking 15 and therefrom to further finishing. By a pusher 19 (shown in FIG. 6) cooperating with the conveyor 18, it is possible to remove aside a full set, half of a set, or a single roll of a set. The rolls may later be returned to the material flow via the same route. Also rolls coming from other sources can be entered in the material flow running on the conveyor 18. Operating in conjunction with the ramp-end conveyor 35, there is disposed a set stop or a retractable backgauge 35 serving to halt the rolls running down the ramp 2. In a special situation the rolls can be allowed to roll over the set stop or retractable backgauge 36 onto the mill floor and later returned to the material flow via the same route.

Referring to FIG. 5, next, after the conveyor 18 is disposed a short conveyor 9 having a pusher 10 on its side. On the opposite side of the pusher 10 relative to the short conveyor 9 is placed automatic roll marking equipment 15. The roll marking equipment is provided with information on the entering sequence of rolls, whereby the equipment can print the roll marking at the roll ends or roll circumference. With the help of a roll measurement unit 16, the correct identification and type of roll can be verified by gauging the physical parameters of the roll. Most advantageously, the roll width is measured as a parameter positively associating the roll with the roll sequence information delivered by the slitter and being readily measurable by means of laser techniques or a combination of a photocell with a pulse-signal position sensor. When required, also the roll diameter or weight can be gauged combined with the measurement of roll end quality and core stick-out. The measured parameters, or at least one of them, are compared with the roll information thus identifying which one of the rolls of a set is being marked at the marking equipment. After the verification, the identification code is printed on one roll end, both ends or the roll circumference by means of marking devices 11 and 12. After marking, the roll is transferred from the marking equipment 15 to a conveyor 13 on which the roll is halted by a stop 14. The conveyor 13 moves the roll forward.

FIG. 7 shows the next alternative layout of a shaft-supported slitter, wherein rolls can be removed or added under the control of the material flow system. To both sides of the slitter 20 there is disposed a conveyor 22, 23 combined with a roll set stop or retractable backgauges 24, 25 serving to stop the rolling of rolls down the ramp. Inasmuch the rolls 21 are herein discharged from the slitter 20 already properly grouped, they are advantageously stopped by such stops 24, 25 that are able to handle single rolls 21, whereby a stopping force compatible with the mass of the roll can be applied. In a special situation the rolls can be allowed to roll over the set stop or retractable backgauge 24, 25 onto the mill floor and later returned to the material flow via the same route. Manual rolling methods may also be used for removing rolls from the conveyors 22, 23 or, respectively, adding rolls thereto. From the conveyors 22, 23 located beside the slitter 20, the rolls are transferred to turntable conveyors 26, 27.

Rolls leaving the conveyor 22 can be moved directly onto the turntable conveyor 26, wherefrom they are moved to marking equipment 15. Rolls leaving the conveyor 23 are first passed to a turntable conveyor 27, which is next rotated into a position transverse to the conveyor 23. Subsequently, the roll can be moved from the turntable conveyor to a conveyor 28 located at the end of the slitter. The conveyor 28 at the end of the slitter 20 is followed by a turntable conveyor 26. This turntable conveyor 26 must next be rotated parallel to the conveyor 28 before the roll can be passed onto the turntable conveyor 26, whereafter the turntable conveyor is rotated parallel to the conveyor 22. As soon as the turntable conveyor 26 is aligned parallel to the conveyor 22, the roll resting thereon can be moved to marking equipment 15. Roll marking at the marking equipment 15 is carried out similarly as with the equipment of FIG. 5. In FIG. 7 is further shown a portion of a conveyor system comprising, e.g., a conveyor 30 suited for transferring the rolls in the direction of, e.g., a wrapping machine, and a pusher 29 serving to push the rolls toward any subsequent process phase such as a rewinder or internal finishing step of the mill. It must be noted that in the above-described embodiments, new rolls may not be added to the material flow amidst an ongoing handling of a full roll set. If the roll order of the set is disturbed, the material flow control system must be set in manual mode or otherwise steered so that the markings are made on correct rolls. In this situation, the system can be operated, e.g, in the same fashion as conventional roll marking systems.

The above-described implementations (FIGS. 1–7) represent exemplifying system layouts. In addition to those, the invention may have alternative embodiments of system layouts. For instance, the roll set can have a plurality of storage sites prior to the separation of rolls from the set, and respectively, half-sets can have a separate storage site or sites. In the layout illustrated in FIG. 7, the turntable conveyors as well as the conveyor placed thereinbetween can be replaced by ramp arrangements.

As is evident from the above-described exemplifying embodiments, the system layout can be designed without major restrictions. The essential feature herein is that the roll marking is performed automatically at the slitter. In this context, the term slitter must be understood to refer to that system area within which the roll information of a full set of rolls leaving the slitter is available to the system. In a practicable control system, the control of the marking equipment can be implemented equally well within either the logic control regime of the slitter or of the roll conveyors, provided that the roll information of the set leaving the slitter is properly transmitted for use by the marking equipment.

The roll identification markings can be made either on both ends or on one end of a roll or on the roll circumference, and the identification can be implemented using any suitable standardized code. In a system according to the invention, however, the customer identification code is preferred, whereby the roll ends are marked with the identification code of the customer having placed the order for the roll. This marking contains all the necessary roll data, and inasmuch it must anyhow be printed on the rolls to fulfill customer needs, it can simultaneously serve as an advantageous roll identification code. The printing operation may be carried out using ink-jet printers or other suitable printing devices. When desired, the verification of roll identification (based on the measurement of roll width, diameter, weight, end quality, core stick-out, etc.) can be performed in a separate roll stop station prior to the printing of the roll identification code, whereby transfer means are required for moving the roll between the roll stop station and the marking equipment.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for marking customer rolls wound from a paper, board or cellulose web at a slitter, comprising:

transmitting to roll marking equipment roll identification data for a roll leaving the slitter;

separating rolls of a set of rolls leaving the slitter, the rolls being separated from other rolls of the set of rolls;

passing the rolls to a roll marking station;

marking roll identification data on a surface of each roll passing through the roll marking station;

removing each roll from the roll marking station after each roll has been marked with a roll identification code; and preventing any rolls from entering the roll marking station until all rolls of a previous set of rolls has been marked with roll identification data and removed from the roll marking station.

2. The method of claim 1, wherein the surface of each roll being marked with roll identification data is an end of the roll.

3. The method of claim 1, further comprising:

storing dimensional and quality data of rolls for a set of rolls;

measuring a physical parameter of a roll prior to marking the roll; and comparing the measured physical parameter of the roll with the dimensional and quality data of rolls for the set of rolls to verify an identity of the roll.

4. The method of claim 3, wherein a physical parameter of a roll that is measured comprises roll width.

5. The method of claim 4, wherein a physical parameter of a roll that is measured further comprises at least one of roll diameter and roll weight.

6. The method of claim 3, wherein a physical parameter of a roll that is measured further comprises roll end quality.

7. The method of claim 3, wherein a physical parameter of a roll that is measured further comprises a length a core of the roll extends beyond the wound web.

8. The method of claim 3, wherein marking of surface of the roll is performed by an ink-jet printer.

9. An apparatus for marking customer rolls wound from a paper, board or cellulose web at a slitter, comprising:

means for providing roll identification data for a roll leaving the slitter;

means for separating rolls of a set of rolls leaving the slitter from other rolls of the set of rolls;

a roll marking station comprising a means for marking the roll identification data on a surface of each roll received by said roll marking station;

means for controlling a flow of rolls so that rolls leave the slitter after passing through said roll marking station;

means for storing dimensional and quality data of rolls for a set of rolls;

means for measuring a physical parameter of a roll prior to marking the roll; and means for comparing the measured physical parameter of the roll with the dimensional and quality data of rolls for the set of rolls to verify an identity of the roll.

10. The apparatus of claim 9, wherein the means for marking is capable of marking the roll identification data on an end of a roll in the marking station.

11. The apparatus of claim 9, wherein said measuring means measures a width of a roll.

12. The apparatus of claim 9, wherein said measuring means measures at least one of a diameter and a weight of a roll.

13. The apparatus of claim 9, wherein said measuring means measures roll end quality.

14. The apparatus of claim 9, wherein said measuring means measures a length of a core of the roll extends beyond the wound web.

* * * * *